Aug. 8, 1950  E. J. KIES  2,517,884
TIRE SIGN DISPLAY
Filed April 18, 1947

Inventor
Elliott J. Kies

By Frease and Bishop
Attorneys

Patented Aug. 8, 1950

2,517,884

UNITED STATES PATENT OFFICE 2,517,884

TIRE SIGN DISPLAY

Elliott J. Kies, Canton, Ohio, assignor to The Massillon-Cleveland-Akron Sign Company, Massillon, Ohio, a corporation of Ohio Application April 18, 1947, Serial No. 742,246

4 Claims. (Cl. 40—125)

The invention relates generally to improvements in sign displays, and more particularly to a novel sign construction adapted to be mounted in a tire casing for display purposes.

Prior sign constructions carrying an advertising message have been adapted to be used in conjunction with tires displayed for sale, but such sign displays have been of a flat, substantially circular construction, located inside the circular opening formed within the tire casing. A simple construction of such a sign display may be a circular flat insert held in the tire opening by simple tabs or ears which project into or engage the hollow inner portion of the tire casing.

In such prior constructions, the plane of the display is located substantially in the central plane of the tire casing, and is spaced somewhat behind the outermost parts of the casing. Consequently, the range in which the display is visible to an observer is materially limited because the display is not visible from the sides of the tire casing or at acute angles to the plane thereof. Moreover, with such constructions, the display sign is not held in the tire casing firmly enough to prevent rotation or accidental displacement of the display, thereby detracting from or destroying its advertising value.

It is an object of the present invention to provide a novel and improved tire sign display having three-dimensional characteristics, so that part of the display surfaces are in different planes, making the display visible to an observer over a maximum range.

Another object is to provide a novel and improved tire sign display which is adapted to be made in a single piece in flat foldable form.

Another object is to provide a novel and improved tire sign display having foldable portions adapted to cooperate with a tire casing to firmly hold the display within the casing in proper position.

A further object is to provide a novel and improved tire sign display which is foldable to firmly engage tire casings of different sizes for firmly mounting the display therein.

Finally, it is an object of the present invention to provide a novel and improved tire sign display which is extremely simple and inexpensive in construction, and which is adapted to be used in conjunction with tire casings displayed for sale, without requiring any tools or any special skill.

These and other objects are accomplished by the parts, elements, constructions, arrangements, and combinations, which comprise the present invention, the nature of which is set forth in the following general statement, a preferred embodiment of which is set forth in the following description and illustrated in the accompanying drawings, and which is particularly and distinctly pointed out and set forth in the appended claims forming part hereof.

In general terms, the present invention comprises a sign display construction which is made of a single flat sheet scored or creased for folding so as to provide display surfaces in different planes, and at the same time to provide spaced tire-engaging notches and foldable tabs for firmly and detachably mounting the display within a tire casing.

Referring to the drawing forming part hereof, in which a preferred embodiment of the invention is shown by way of example;

Similar numerals refer to similar parts throughout the several views of the drawing.

Figure 1:
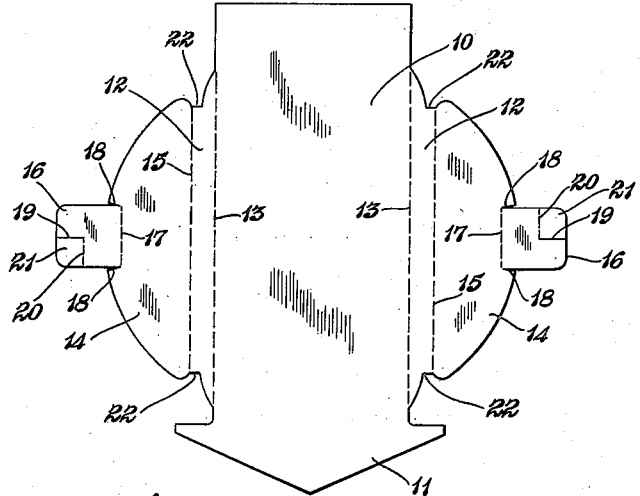
Figure 1 is an elevational view of the flat sheet blank having score lines for facilitating folding the blank into three-dimensional form for fitting within a tire casing and functioning as a display.

Referring to Fig. 1, the tire display shown may be die cut in flat form from cardboard or fibreboard, or thin sheet metal, and as shown, is provided with scored or fold lines ready to be folded into three-dimensional form for mounting within a tire casing. The tire sign display preferably includes a central flat section 10 providing a display surface, and the section 10 may have a substantially arrow shape with the head or point 11 of the arrow projecting downwardly, for attracting the attention of the observer.

The opposite sides of the central section 10 are bounded by folding strips 12 which are connected to the central section 10 by fold lines 13. The outer edges of the folding strips 12 are connected to curved segment-shaped wing portions 14 which are connected to the folding strips 12 by fold lines 15. Each wing 14 is provided with an outwardly projecting flap 16 which may be substantially square as shown and which is connected to the wing by a vertical fold line 17. As shown the fold line 17 is preferably spaced radially inward of the outer edge of the wing and the wing is cut or notched along the adjacent portions of the flap, as at 18, to permit folding of the flap along line 17.

The outer portion of each flap is preferably cut horizontally throughout a portion of its width along a line 19, and is provided with a vertical fold line 20 extending from the inner end of the cut line 19 vertically to the upper or lower edge of the flap 16. Preferably, one of the fold lines 20 extends to the upper edge of one flap and the other fold line 20 extends to the lower edge of the other flap, as indicated in Fig. 1. The fold lines 20 and cut lines 19 thus form a foldable tab 21 at one outer corner of each flap 16.

Figure 4:
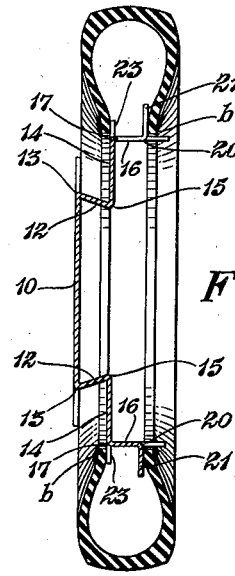
Fig. 4 is a transverse sectional view as on line 4—4, Fig. 2, the tire casing being shown in cross section.
Figure 2:
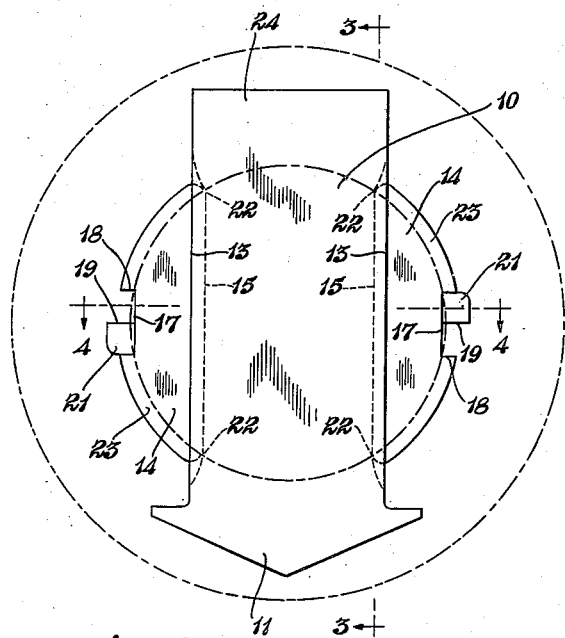
Fig. 2 is a front elevation of the improved sign display in folded form for fitting within a tire casing, the tire casing being shown in dot-dash lines.
Figure 3:
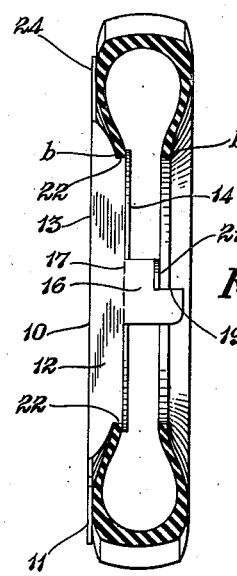
Fig. 3 is a side elevation of the improved sign display mounted within a tire casing, the casing being shown in cross section substantially along line 3—3, Fig. 2.

The improved tire sign display may be shipped or transported in the flat form shown in Fig. 1 so as to occupy a minimum of space, and when it is desired to mount the display in a tire casing it is quickly and easily folded by an unskilled person to the form shown in Figs. 2, 3 and 4. In order to provide for firmly mounting the display in its folded three-dimensional form in a tire casing, the upper and lower edges of the folding strip portions 12 are provided with notches 22 which are adapted to engage the inner bead portion of a tire casing at four spaced points.

The manner of folding the improved display is readily apparent from Figs. 2, 3 and 4 of the drawings, which show the folding portions 12 as being folded along lines 13 backwardly and slightly under the central section 10, the wings 14 being folded outwardly along the fold lines 15 into planes parallel with section 10 and spaced inwardly thereof. The flaps 16 are folded rearwardly along the fold lines 17 so that they abut radially against the inner edges of the front and rear tire beads b and b', as best shown in Fig. 4, and the small tabs 21 are folded outwardly along the fold lines 20 to extend substantially parallel with the wings 14 and into the tire casing in engagement with the front annular surface of the rear tire bead b'.

When the improved sign display is thus mounted within a tire casing, the notches 22 firmly engage the inner edge of the front tire bead b at four spaced points to prevent rotation of the tire sign display within the casing, and the outer arcuate edge portions 23 of the wings 14 extend into the casing in engagement with the front tire bead b. The flaps 16 engage the inner edge of the rear tire bead b', at two diametrically opposite locations, and the small tabs 21 extend into the tire casing and engage the surface of the rear bead b' to prevent backward movement of the display within the casing. Thus, the display is firmly held against rearward displacement by the tabs 21 and against forward displacement by the arcuate edge portions 23 of the wings 14 overlapping the tire bead b.

As shown, the lower arrow head portion 11 of the central section and the upper end portion 24 thereof may overlap and engage the front surface of the tire casing to further aid in holding the display firmly in position. The fold lines 13 and 15 of the folding strips 12 and the fold lines 17 and 20 of the flaps 16 and tabs 21 tend to return the sections to their original flat position, by providing a certain amount of resiliency urging the tire engaging parts into yielding frictional engagement with the tire casing, thus insuring that the display is firmly held in position. The locations of the points 22 and the flaps 16 may be varied sufficiently to fit various sizes of tire casings, by folding the strips 12 under the central section 10 at various angles; in other words, in order to fit smaller tire casings, the strips 12 are folded under the central section 10 to a greater extent.

Obviously, the size and shape of the central section 10 can be varied to be adapted for different advertising displays, and the wings 14 may also carry advertising matter which will also be visible to an observer in front of the tire display. The front section 10, however, due to its forwardly spaced position provided by the folding strips 12, will be visible to an observer over a much wider range, thereby increasing the advertising value of the display, while at the same time the various foldable elements strengthen the display and provide for firmly engaging the tire casing at numerous spaced points to prevent displacement of the display.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover the embodiment of the improved construction illustrated and described herein is by way of example, and the scope of the present invention is not limited to the exact details of construction.

Having now described the invention, the construction, the operation and use, and a preferred embodiment thereof, and the advantageous new and useful results obtained thereby; the new and useful constructions, and reasonable mechanical equivalents thereof obvious to those skilled in the art, are set forth in the appended claims.

I claim:

1. A tire sign display including a flat central front section, foldable strips at opposite sides of said central section for folding rearwardly, wings foldably attached to said strips for folding outwardly thereof in a plane parallel to said central section, said foldable strips having notches at their ends for engaging the inner bead edge of a tire casing at four spaced points when folded, and flaps on the wings foldable rearwardly for engaging the inner bead edge of a tire casing.

2. A tire sign display including a flat central front section, foldable strips at opposite sides of said central section for folding rearwardly, wings foldably attached to said strips for folding outwardly thereof in a plane parallel to said central section, said foldable strips having notches at their ends for engaging the inner bead edge of a tire casing at four spaced points when folded, and flaps on the wings foldable rearwardly for engaging the inner bead edge of a tire casing, said flaps having foldable portions for extending into the tire casing and engaging the front surface of the rear bead thereof.

3. A tire sign display including a central front section, foldable strips at opposite sides of said central section for folding rearwardly, wings foldably attached to said strips for folding outwardly therefrom to be in a plane parallel to said central section and having outer edges for fitting under the front bead of a tire casing, and flaps on said wings foldable rearwardly for engaging the inner edge of the rear bead.

4. A tire sign display including a central front section, foldable strips at opposite sides of said central section for folding rearwardly, wings foldably attached to said strips for folding outwardly therefrom to be in a plane parallel to said central section and having outer edges for fitting under the front bead of a tire casing, flaps on said wings foldable rearwardly for engaging the inner edge of the rear bead, and said flaps having foldable tabs for extending angularly into the tire casing and engaging the front surface of the rear bead thereof.

ELLIOTT J. KIES.

REFERENCES CITED

The following references are of record in the file of this patent:

UNITED STATES PATENTS

| Number | Name | Date |
|---|---|---|
| 1,809,298 | Heywood | June 9, 1931 |
| 1,943,237 | Harrington | Jan. 9, 1934 |
| 2,177,467 | Sunderhauf | Oct. 24, 1939 |
| 2,286,756 | Mullen | June 16, 1942 |